(12) United States Patent
Pabla et al.

(10) Patent No.: US 11,486,263 B1
(45) Date of Patent: Nov. 1, 2022

(54) SYSTEM FOR ADDRESSING TURBINE BLADE TIP RAIL WEAR IN RUBBING AND COOLING

(71) Applicant: General Electric Company, Schenectady, NY (US)

(72) Inventors: Surinder Singh Pabla, Greer, SC (US); Martin James Jasper, Simpsonville, SC (US); Neelesh Nandkumar Sarawate, Niskayuna, NY (US); Bradley Taylor Boyer, Greenville, SC (US); Srikanth Chandrudu Kottilingam, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/359,820

(22) Filed: Jun. 28, 2021

(51) Int. Cl.
  *F01D 11/12* (2006.01)
  *F01D 5/14* (2006.01)

(52) U.S. Cl.
  CPC ............ *F01D 11/122* (2013.01); *F01D 5/147* (2013.01)

(58) Field of Classification Search
  CPC .. F01D 5/147; F01D 11/122; F05D 2240/301; F05D 2240/31
  See application file for complete search history.

(56) References Cited

U.S. PATENT DOCUMENTS

| | | | |
|---|---|---|---|
| 4,390,320 A * | 6/1983 | Eiswerth | F01D 5/20 29/889.1 |
| 4,589,823 A * | 5/1986 | Koffel | F01D 5/20 416/241 B |
| 6,102,656 A * | 8/2000 | Nissley | F01D 5/288 415/174.4 |
| 6,537,021 B2 | 3/2003 | Howard et al. | |
| 6,887,595 B1 | 5/2005 | Darolia et al. | |
| 7,291,403 B2 | 11/2007 | Nagaraj et al. | |
| 7,351,482 B2 | 4/2008 | Boutwell et al. | |
| 8,124,252 B2 | 2/2012 | Cybulsky et al. | |
| 8,206,108 B2 * | 6/2012 | Riahi | F01D 5/18 416/228 |
| 8,647,073 B2 | 2/2014 | Hoebel et al. | |
| 8,740,572 B2 | 6/2014 | Hoebel et al. | |
| 9,909,428 B2 | 3/2018 | Kottilingam et al. | |
| 10,738,644 B2 | 8/2020 | Shi et al. | |
| 10,934,852 B2 | 3/2021 | Honkomp et al. | |

(Continued)

*Primary Examiner* — Courtney D Heinle
*Assistant Examiner* — Danielle M. Christensen
(74) *Attorney, Agent, or Firm* — Charlotte Wilson; Hoffman Warnick LLC

(57) ABSTRACT

A system for a turbine blade tip to address wear during rubbing with a shroud, and also tip rail cooling, is provided. The turbine blade tip includes a tip rail and cooling passage(s) extending through a radially outer end surface thereof, providing direct cooling to the tip. The tip rail may include tip rail cooling inserts. The radial outer end surface of the tip rail includes a first portion radially inward of a second portion thereof. An abrasive layer extends along the first portion adjacent the cooling passage(s), and may include a matrix alloy having a plurality of cubic boron nitride (cBN) particles and a plurality of ceramic particles embedded therein. The abrasive layer extends radially outward of the second portion of the radial outer end surface. The system also may include a shroud including an abradable coating thereon.

11 Claims, 8 Drawing Sheets

(56) References Cited

U.S. PATENT DOCUMENTS

| | | | | |
|---|---|---|---|---|
| 2008/0286459 | A1* | 11/2008 | Cheung | C23C 24/04 427/201 |
| 2015/0211382 | A1* | 7/2015 | Podgorski | B22F 7/08 427/193 |
| 2016/0069195 | A1* | 3/2016 | Hewitt | F01D 5/20 416/241 B |
| 2019/0063250 | A1* | 2/2019 | Shi | F01D 5/288 |

* cited by examiner

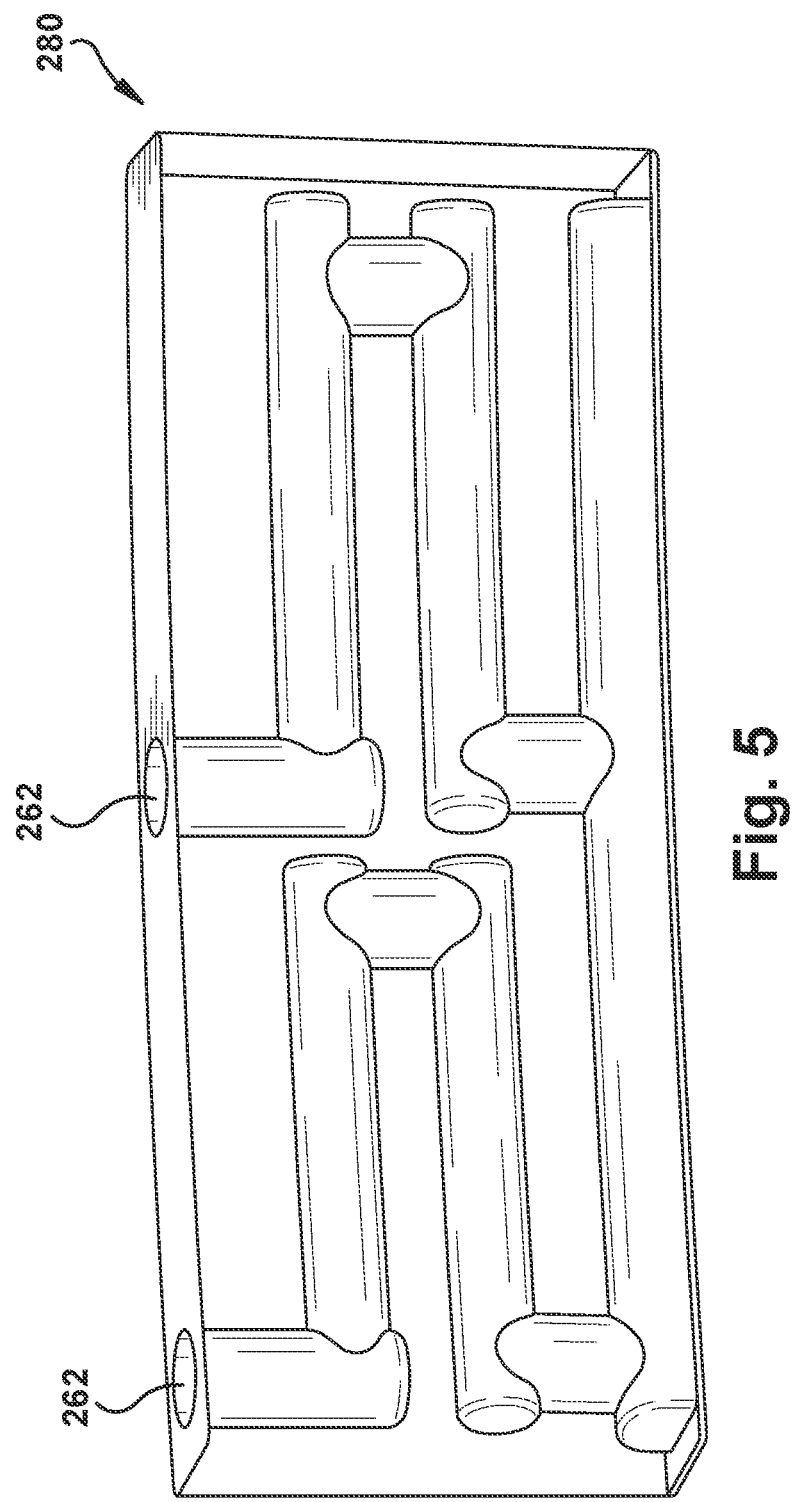

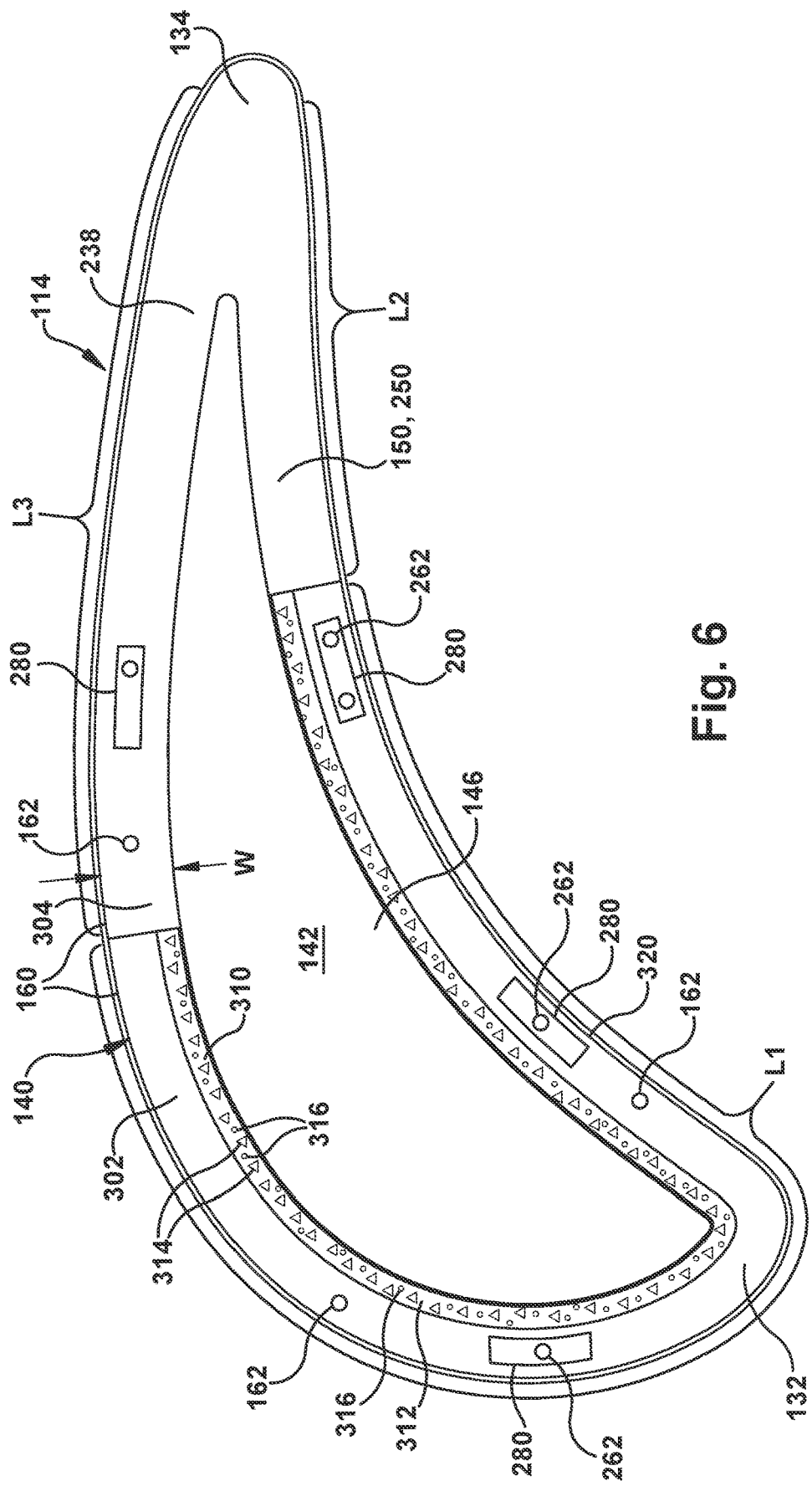

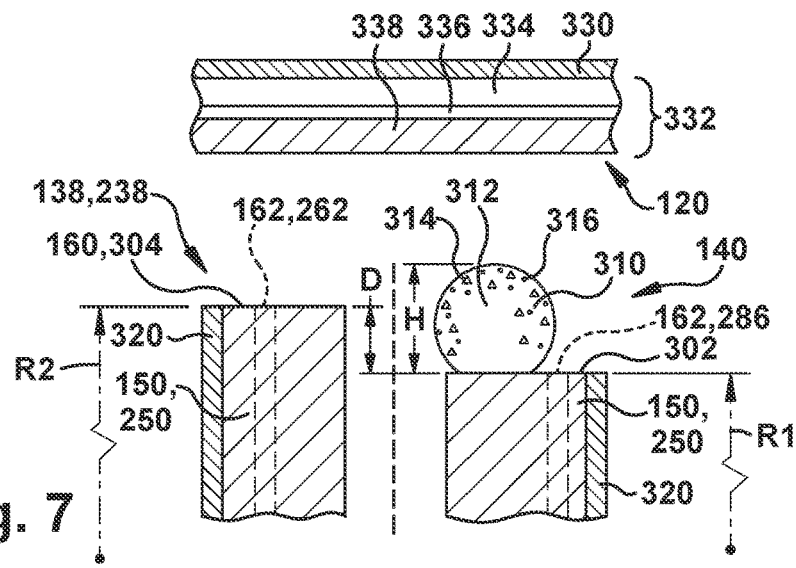
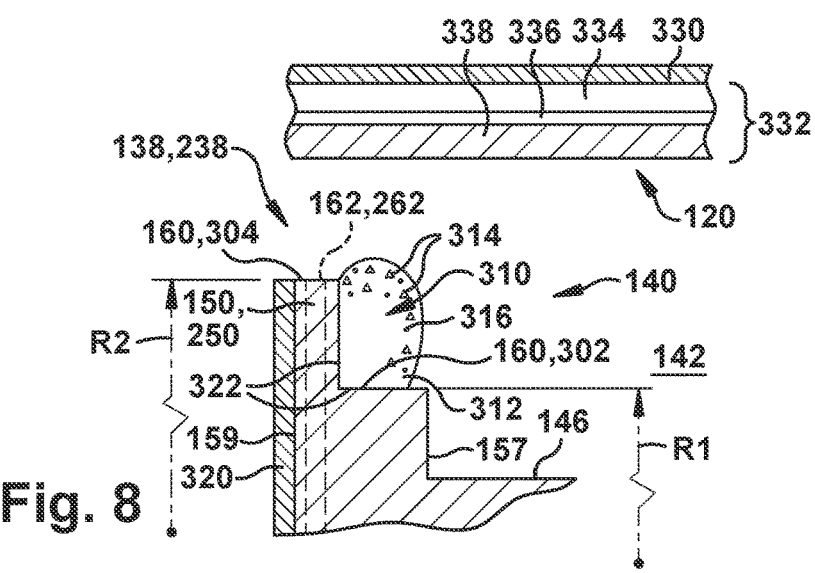
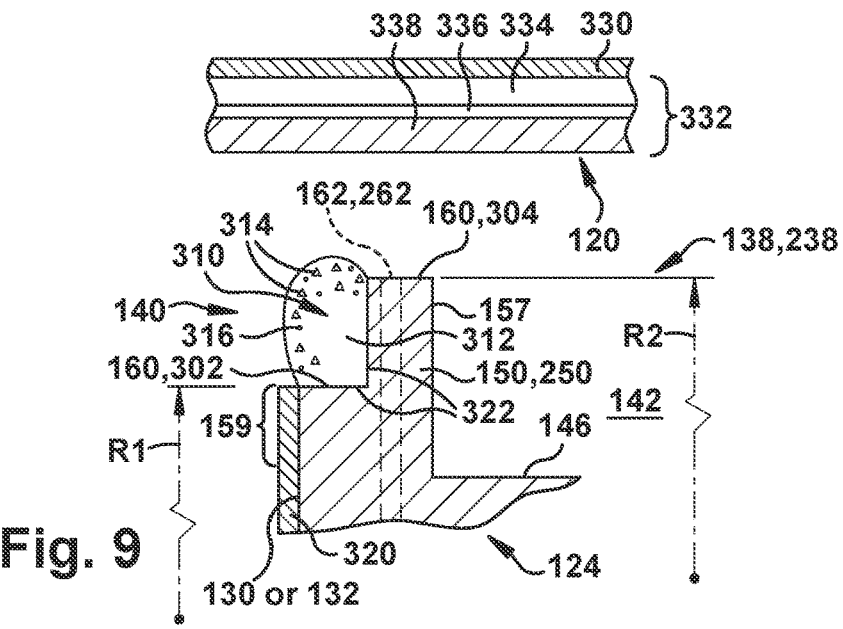

SYSTEM FOR ADDRESSING TURBINE BLADE TIP RAIL WEAR IN RUBBING AND COOLING

TECHNICAL FIELD

The disclosure relates generally to turbine components, and more particularly, to a system for a turbine blade tip to address wear during rubbing with a shroud and tip rail cooling.

BACKGROUND

In a gas turbomachinery, air is pressurized in a compressor and used to combust a fuel in a combustor to generate a flow of hot combustion gases, whereupon such gases flow downstream through one or more turbines so that energy can be extracted therefrom. In accordance with such a turbine, generally, rows of circumferentially spaced turbine blades extend radially outwardly from a supporting rotor disk. Each blade typically includes a dovetail that permits assembly and disassembly of the blade in a corresponding dovetail slot in the rotor disk, as well as an airfoil that extends radially outwardly from the dovetail.

The airfoil has a generally concave pressure side wall and generally convex suction side wall extending axially between corresponding leading and trailing edges and radially between a root and a tip. Within a turbine engine, a shroud is a ring of material surrounding the rotating blades. Shrouds are stationary and may be formed of ceramic matrix composites (CMCs) protected with an environmental barrier coating (EBC) to avoid oxidation and recession in the presence of high temperature gas flow. Alternatively, shrouds may include metal components protected with a thermal barrier coating (TBC) to avoid oxidation and recession in the presence of high temperature air flow.

Turbine performance and efficiency may be enhanced by reducing the space between the tip of the rotating blade and the stationary shroud to limit the flow of gases over or around the tip of the blade that would otherwise bypass the blade. For example, a blade may be configured so that its tip fits close to the shroud during engine operation. Thus, generating and maintaining a small tip clearance is particularly desired for efficiency purposes. During engine operation, the blade tips can sometimes rub against the shroud, thereby increasing the gap and resulting in a loss of efficiency, or in some cases, damaging or destroying the blade set.

To reduce the loss of efficiency, an abradable coating may be deposited on the top of the EBC or TBC on the shroud, or the EBC (or TBC) may serve as the abradable coating. In the high temperature environments found in an aircraft engine or a gas turbine, the metal blade strength is decreased and the blade-shroud rubbing further elevates the temperature of the blade tip due to friction caused thermal effect, resulting in severe blade wear. Accordingly, the abradable coating is required to be "softer" than the blades at working temperatures. The abradable coating however cannot be too soft, as it will be eroded too fast. In one particular instance, the abradable coating is formed as, a continuous, but rough, ceramic layer and is typically quite hard. The hardness of this continuous abradable coating may prevent it from abrading, but rather will cause the tips of the rotating blades to abrade.

In another particular instance, the abradable coating is formed as a series of ceramic ridges that break away upon contact with the rotating blade tip. The ceramic material is typically made out of the same ceramic material as one of the EBCs, for example, rare earth disilicate or barium strontium aluminosilicate (BSAS). Current efforts in developing abradable materials for gas turbines rely on patterned (e.g., camberline, straight line, diamond) or rough but flat ceramic coatings for the EBC coated shroud while maintaining a reasonable erosion resistance. However, the patterned ridges on the surface of the shroud reduce aerodynamic efficiency and tend to be more expensive and have less thermal protection.

In other approaches, an abrasive layer may be provided on the tip to assist in forming a close-fit tolerance with the shroud. A challenge with abrasive layers on the tip is that turbine blades are also cooled to ensure useful part life. Typically, the blade airfoils are hollow and disposed in fluid communication with the compressor so that a portion of pressurized air bled therefrom is received for use in cooling the airfoils and tips, as a coolant. Airfoil and tip cooling is quite sophisticated and may be employed using various forms of internal cooling channels and features, as well as cooling holes through the radially outer tip rail surfaces of the airfoil for discharging the coolant. Nevertheless, airfoil tips are particularly difficult to cool since they are located directly adjacent to the turbine shroud and are heated by the hot combustion gases that flow through the tip gap, and by the afore-described rubbing. Accordingly, a portion of the coolant channeled inside the airfoil of the blade is typically discharged through the tip rail for the cooling thereof. The presence of an abrasive layer presents challenges to ensuring the cooling passages are effective.

It will be appreciated that conventional blade tips include several different geometries and configurations that are meant to prevent leakage and increase cooling effectiveness. Conventional blade tips, however, all have certain shortcomings, including a general failure to adequately reduce leakage and/or allow for efficient tip cooling that minimizes the use of efficiency-robbing compressor bypass air. One approach, referred to as a "squealer tip" arrangement, provides a radially extending rail that may rub against the tip shroud. The tip rail reduces leakage and therefore increases the efficiency of turbine engines, but oftentimes is the hottest region in the blade and thus presents challenges relative to cooling and ensuring a close clearance with the shroud.

BRIEF DESCRIPTION

All aspects, examples and features mentioned below can be combined in any technically possible way.

An aspect of the disclosure provides a system, comprising: a turbine blade having: an airfoil having a pressure side wall and a suction side wall extending between a leading edge and a trailing edge; a tip at a radial outer end of the airfoil, the tip including a tip rail and at least one cooling passage extending through a radially outer end surface of the tip rail, wherein the radial outer surface includes a first portion radially inward of a second portion thereof; and an abrasive layer extending along the first portion of the radially outer end surface of the tip rail adjacent the at least one cooling passage, wherein the abrasive layer includes a matrix alloy having a plurality of cubic boron nitride (cBN) particles and a plurality of ceramic particles embedded therein, and wherein the abrasive layer extends radially outward of the second portion of the radial outer end surface of the tip rail; and a stationary blade shroud including a body and an abradable coating on the body, wherein the stationary blade shroud and the tip of the turbine blade are configured so the abrasive layer on the tip rail contacts a portion of the stationary blade shroud during rotation of the turbine blade, wherein the abradable coating is configured to be abraded by the contact with the abrasive layer.

Another aspect of the disclosure includes any of the preceding aspects, and the first portion is radially inward of the second portion by a distance that is in a range of 50% to 90% of a radial extent of the abrasive layer.

Another aspect of the disclosure includes any of the preceding aspects, and the first portion is surrounded by the second portion, providing a stepped surface in which the abrasive layer is positioned.

Another aspect of the disclosure includes any of the preceding aspects, and the first portion extends along a first length of the tip rail that excludes the second portion, and the second portion extends along at least one second length of the tip rail that excludes the first portion.

Another aspect of the disclosure includes any of the preceding aspects, and the first portion includes an extent of the radial outer end surface of the tip rail that is radially adjacent at least one of the suction side wall and the pressure side wall of the airfoil.

Another aspect of the disclosure includes any of the preceding aspects, and the plurality of ceramic particles include at least one of: aluminum oxide, sapphire, diamond, rhenium diboride (c-axis), silicon carbide, titanium carbide, tungsten carbide, titanium nitride, silicon nitride, and tantalum carbide.

Another aspect of the disclosure includes any of the preceding aspects, and the matrix alloy includes one of cobalt-nickel-chrome-aluminum-yttrium (CoNiCrAlY) and Haynes 214.

Another aspect of the disclosure includes any of the preceding aspects, and the abradable coating includes a bond coat on the body, a strain tolerant layer on the bond coat, and an abradable thermal barrier coating (TBC) on the strain tolerant layer.

Another aspect of the disclosure includes any of the preceding aspects, and the strain tolerant layer includes an yttria-stabilized zirconia (YSZ), and the abradable TBC includes a dense vertically-cracked thermal barrier coating (DVC-TBC).

Another aspect of the disclosure includes any of the preceding aspects, and the DVC-TBC includes a rare earth doped zirconium oxide, yttria stabilized zirconia (YSZ), mullite ($3AL_2O_3$-$2SiO_2$), alumina ($Al_2O_3$), ceria ($CeO_2$), rare-earth zirconates (e.g., $La_2Zr_2O_7$), rare-earth oxides (e.g., $La_2O_3$, $Nb_2O_5$, $Pr_2O_3$, $CeO_2$), a metal glass composite, and combinations thereof.

Another aspect of the disclosure includes any of the preceding aspects, and the abradable coating has a porosity of less than 5%.

Another aspect of the disclosure includes any of the preceding aspects, and the tip rail includes a tip rail pocket and a tip rail cooling insert having the at least one cooling passage therein, wherein the tip rail cooling insert is attached to the tip rail pocket.

Another aspect of the disclosure includes any of the preceding aspects, and the abrasive layer includes a pair of spaced abrasive layers extending along the first portion of the radially outer end surface of the tip rail, wherein the at least one cooling passage is positioned between the pair of spaced abrasive layers in the radial outer end surface of the tip rail.

Another aspect of the disclosure includes any of the preceding aspects, and the abradable coating has a surface roughness of less than 90 Ra.

An aspect of the disclosure relates to a system, comprising: a turbine blade having: an airfoil having a pressure side wall and a suction side wall extending between a leading edge and a trailing edge; a tip at a radial outer end of the airfoil, the tip including a tip rail and at least one cooling passage extending through a radially outer end surface of the tip rail, wherein the radial outer surface includes a first portion radially inward of a second portion thereof; and an abrasive layer extending along the first portion of the radially outer end surface of the tip rail adjacent the at least one cooling passage, wherein the abrasive layer includes a matrix alloy having a plurality of cubic boron nitride (cBN) particles and a plurality of ceramic particles embedded therein, and wherein the abrasive layer extends radially outward of the second portion of the radial outer end surface of the tip rail, wherein the tip rail includes a tip rail pocket and a tip rail cooling insert having the at least one cooling passage therein, wherein the tip rail cooling insert is attached to the tip rail pocket.

Another aspect of the disclosure includes any of the preceding aspects, and further comprising a stationary blade shroud including a body and an abradable coating on the body, the abradable coating having a surface roughness of less than 90 Ra, wherein the stationary blade shroud and the tip of the turbine blade are configured so the abrasive layer on the tip rail contacts a portion of the stationary blade shroud during rotation of the turbine blade, wherein the abradable coating is configured to be abraded by the contact with the abrasive layer.

Another aspect of the disclosure includes any of the preceding aspects, and the abradable coating includes a dense vertically-cracked thermal barrier coating (DVC-TBC) having a porosity of less than 5%.

Another aspect of the disclosure includes any of the preceding aspects, and the first portion is radially inward of the second portion by a distance that is in a range of 50% to 90% of a radial extent of the abrasive layer.

Another aspect of the disclosure includes any of the preceding aspects, and the first portion is surrounded by the second portion, providing a stepped surface in which the abrasive layer is positioned.

Another aspect of the disclosure includes any of the preceding aspects, and the first portion extends along a first length of the tip rail that excludes the second portion, and the second portion extends along at least one second length of the tip rail that excludes the first portion.

Another aspect of the disclosure includes any of the preceding aspects, and the abrasive layer includes a pair of spaced abrasive layers extending along the first portion of the radially outer end surface of the tip rail, wherein the at least one cooling passage is positioned between the pair of spaced abrasive layers in the radial outer end surface of the tip rail.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 5 is an enlarged perspective view of an illustrative tip rail cooling insert(s) for use with a system for a tip, according to embodiments of the disclosure.

FIG. 6 is a top down view of a system for a tip of a turbine component including tip rail cooling insert(s), according to embodiments of the disclosure.

FIG. 7 is an enlarged, schematic cross-sectional view of an abrasive layer of the system for a tip of a turbine component, according to embodiments of the disclosure.

FIG. 8 is an enlarged, cross-sectional view of an abrasive layer of the system for a tip of a turbine component, according to other embodiments of the disclosure.

FIG. 9 is an enlarged, cross-sectional view of an abrasive layer of the system for a tip of a turbine component, according to additional embodiments of the disclosure.

Figure 1:
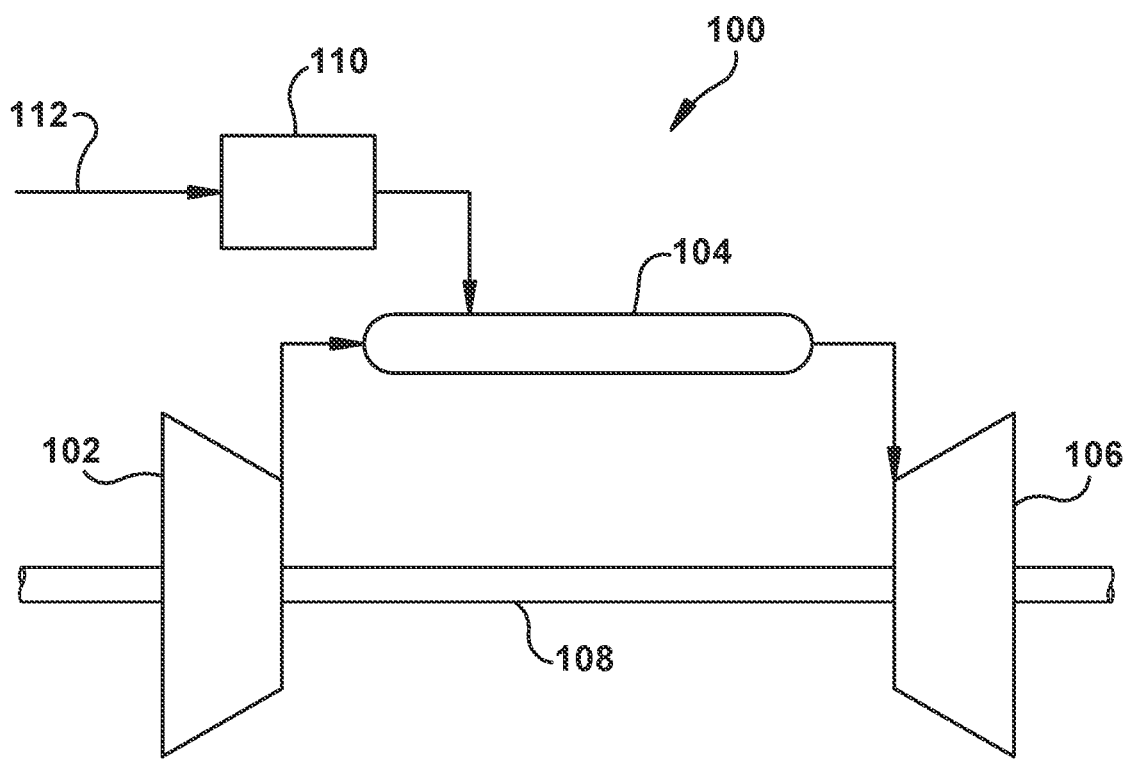
FIG. 1 is a schematic diagram of an example of a turbomachine system.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure it will become necessary to select certain terminology when referring to and describing relevant machine components within a turbomachine and relative to a turbine blade. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a working fluid, such as combustion gases through the turbine engine or, for example, the flow of air through the combustor or coolant through or by one of the turbine's components. The term "downstream" corresponds to the direction of flow of the fluid, and the term "upstream" refers to the direction opposite to the flow. The terms "forward" and "aft," without any further specificity, refer to directions, with "forward" referring to an upstream portion of the part being referenced, i.e., closest to compressor, and "aft" referring to a downstream portion of the part being referenced, i.e., farthest from compressor. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

Where an element or layer is referred to as being "on," "engaged to," "disengaged from," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As used herein, ceramic matrix composite or "CMCs" refers to silicon-containing, or oxide-oxide, matrix and reinforcing materials. Some examples of CMCs acceptable for use herein can include, but are not limited to, materials having a matrix and reinforcing fibers comprising non-oxide silicon-based materials such as silicon carbide, silicon nitride, silicon oxycarbides, silicon oxynitrides, and mixtures thereof. Examples include, but are not limited to, CMCs with a silicon carbide matrix and silicon carbide fiber; silicon nitride matrix and silicon carbide fiber; and silicon carbide/silicon nitride matrix mixture and silicon carbide fiber. Furthermore, CMCs can have a matrix and reinforcing fibers comprised of oxide ceramics. Specifically, the oxide-oxide CMCs may be comprised of a matrix and reinforcing fibers comprising oxide-based materials such as aluminum oxide ($Al_2O_3$), silicon dioxide ($SiO_2$), aluminosilicates, and mixtures thereof. As used herein, environmental-barrier-coating or "EBCs" refers to a coating system comprising one or more layers of ceramic materials, each of which provides specific or multi-functional protections to the underlying CMC. EBCs generally include a plurality of layers, such as rare earth silicate coatings (e.g., rare earth disilicates such as slurry or APS-deposited yttrium ytterbium disilicate (YbYDS)), alkaline earth aluminosilicates (e.g., comprising barium-strontium-aluminum silicate (BSAS), such as having a range of BaO, SrO, $Al_2O_3$, and/or $SiO_2$ compositions), hermetic layer (e.g., a rare earth disilicate) and/or outer coatings (e.g., comprising a rare earth monosilicate, such a slurry or air plasma sprayed (APS) yttrium monosilicate (YMS)). One or more layers may be doped as desired, and the EBC may also be coated with an abradable metal.

As used herein, thermal barrier coating or "TBCs" is used to refer to stabilized ceramics that can sustain a fairly high temperature gradient such that the coated metallic components can be operated at environmental temperatures higher than the metal's melting point. For instance, the TBC may be one or more of yttria stabilized zirconia (YSZ), mullite ($3AL_2O_3$-$2SiO_2$), alumina ($AL_2O_3$), ceria ($CeO_2$), rare-earth zirconates (e.g., $La_2Zr_2O_7$), rare-earth oxides (e.g., $La_2O_3$, $Nb_2O_5$, $Pr_2O_3$, $CeO_2$), and metal glass composites, and combinations thereof (e.g., alumina and YSZ or ceria and YSZ). In the case of YSZ, by substituting a certain amount of zirconium ions ($Zr_4$) with slightly larger yttrium ions ($Y^{3+}$), stable sintered xYSZ (x represents mol % of Yttrium ions, e.g., 8YSZ) can be obtained. Where desired any form of bond coat may be used such as but not limited to cobalt-nickel-chromium-aluminum-yttrium (CoNiCrAlY), nickel-chromium-aluminum-yttrium (NiCrAlY), nickel-cobalt-chromium-aluminum-yttrium (NiCoCrAlY), and/or cobalt-chromium-aluminum-yttrium (CoCrAlY).

As indicated above, embodiments of the disclosure provide a system for a turbine blade tip to address wear during rubbing with a shroud, and also tip rail cooling. As will be described, the system includes a turbine blade having: an airfoil having a pressure side wall and a suction side wall extending between a leading edge and a trailing edge; and a tip at a radial outer end of the airfoil. The tip includes a tip rail and at least one cooling passage extending through a radially outer end surface of the tip rail. Thus, the design of the tip provides for direct cooling to the tip due to a plurality of cooling passages formed therein. In certain embodiments, the cooling passages may be provided at least in part by a tip rail cooling insert, as shown and described in U.S. Pat. No. 10,934,852. The radial outer surface of the tip rail includes a first portion radially inward of a second portion thereof, e.g., an entire recessed width of the tip rail or a step in the tip rail. The turbine blade also includes an abrasive layer extending along the first portion of the radially outer end surface of the tip rail adjacent the at least one cooling passage. The abrasive layer may include a matrix alloy having a plurality of cubic boron nitride (cBN) particles and a plurality of ceramic particles embedded therein. The abrasive layer extends radially outward of the second portion of the radial outer end surface of the tip rail, so it can rub against the stationary blade shroud. The cooling passage(s) of the tip in combination with the abrasive layer provide improved thermal protection (reduced oxidation rate and thus extended retention life) for the abrasive layer, reducing the wear of the tip upon rubbing, and is mechanically resistant to spall and rub in the turbine engine environments.

In certain embodiments, the system also may include the stationary shroud including a body and an abradable coating on the body. The stationary blade shroud and the tip of the turbine blade are configured so the abrasive layer on the tip rail contacts a portion of the stationary shroud during rotation of the turbine blade. The abradable coating is configured to be abraded by the contact with the abrasive layer. The system thus allows tip rail cooling, perhaps customized using tip rail inserts, and provides higher efficiency by creating a smaller tip gap and lower leakage compared to conventional systems.

FIG. 1 is a schematic diagram of an embodiment of a turbomachine system, such as a gas turbine system 100. System 100 includes a compressor 102, a combustor 104, a turbine 106, a shaft 108 and a fuel nozzle 110. In an embodiment, system 100 may include a plurality of compressors 102, combustors 104, turbines 106, shafts 108 and fuel nozzles 110. Compressor 102 and turbine 106 are coupled by shaft 108. Shaft 108 may be a single shaft or a plurality of shaft segments coupled together to form shaft 108.

In one aspect, combustor 104 uses liquid and/or gas fuel, such as natural gas or a hydrogen rich synthetic gas, to run the engine. For example, fuel nozzles 110 are in fluid communication with an air supply and a fuel supply 112. Fuel nozzles 110 create an air-fuel mixture, and discharge the air-fuel mixture into combustor 104, thereby causing a combustion that creates a hot pressurized exhaust gas. Combustor 104 directs the hot pressurized gas through a transition piece into a turbine nozzle (or "stage one nozzle"), and other stages of buckets and nozzles causing turbine 106 rotation. The rotation of turbine 106 causes shaft 108 to rotate, thereby compressing the air as it flows into compressor 102. In an embodiment, hot gas path components, including, but not limited to, shrouds, diaphragms, nozzles, blades and transition pieces are located in turbine 106, where hot gas flow across the components causes creep, oxidation, wear and thermal fatigue of turbine parts. Controlling the temperature of the hot gas path components can reduce distress modes in the components. The efficiency of the gas turbine increases with an increase in firing temperature in turbine system 100. As the firing temperature increases, the hot gas path components need to be properly cooled to meet service life. Although the following discussion primarily focuses on gas turbines, the concepts discussed are not limited to gas turbines and may be applied to other forms of gas turbomachinery, e.g., aircraft engines.

Figure 2:
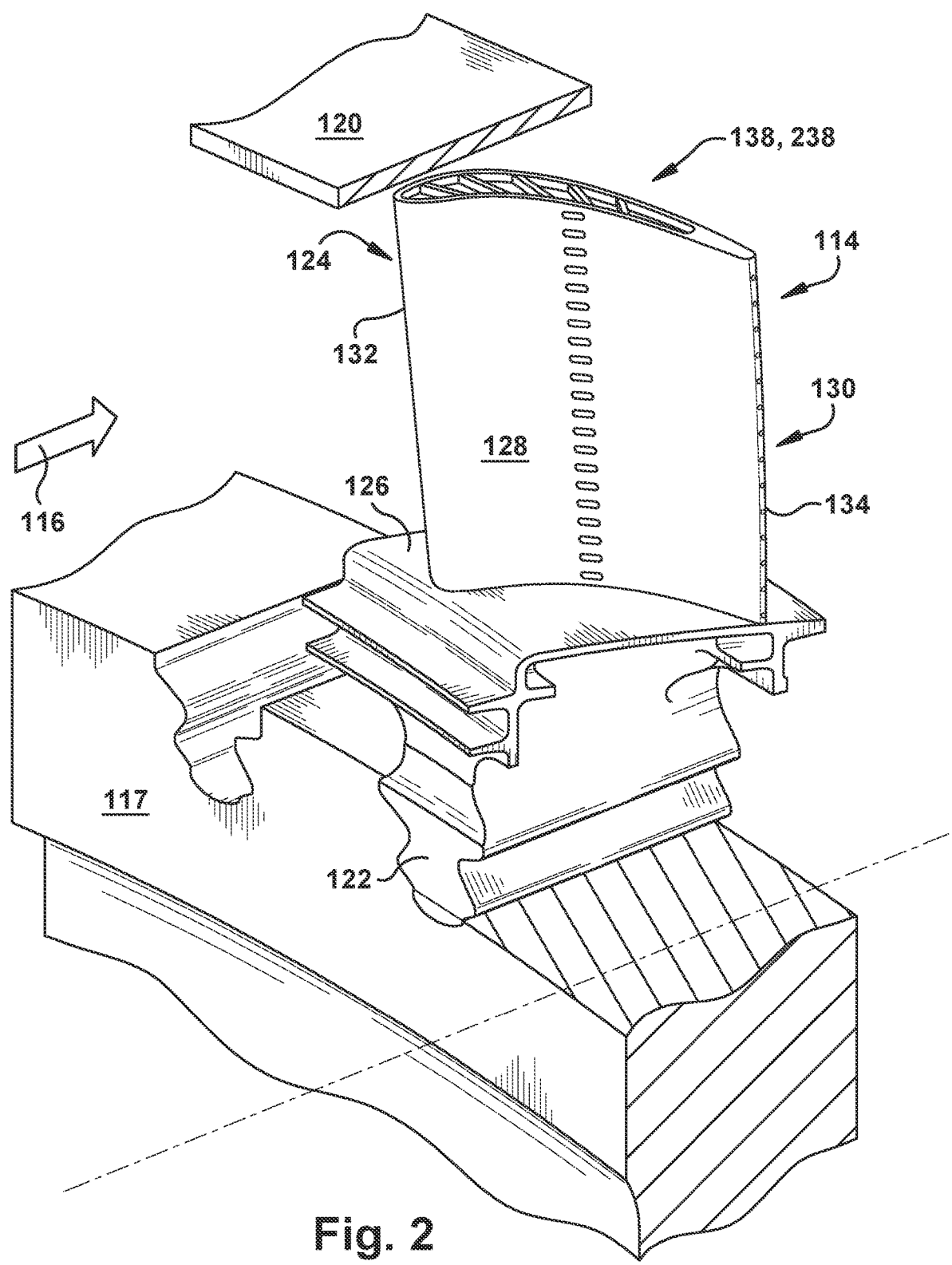
FIG. 2 is a perspective view of an illustrative turbine component in the form of a turbine blade assembly including a rotor disk, a turbine blade, and a stationary shroud.

FIG. 2 is a perspective view of an illustrative turbine blade 114 which is positioned in a turbine of a gas turbine system. A system 140 according to embodiments of the disclosure may include turbine blade 114. It will be appreciated that the turbine is mounted downstream from a combustor for receiving hot combustion gases 116 therefrom. The turbine, which is axisymmetric about an axial centerline axis, includes a rotor disk 117 and a plurality of circumferentially spaced apart turbine blades (only one of which is shown) extending radially outwardly from the rotor disk 117 along a radial axis. Rotor disk 117 is coupled to shaft 108 (FIG. 1). An annular, stationary blade shroud 120 is suitably joined to a stationary stator casing (not shown) and surrounds turbine blades 114 such that a relatively small clearance or gap remains therebetween to limit leakage of combustion gases during operation.

Each turbine blade 114 generally includes a base 122 (also referred to as root or dovetail) which may have any conventional form, such as an axial dovetail configured for being mounted in a corresponding dovetail slot in the perimeter of rotor disk 117. A hollow airfoil 124 is integrally joined to base 122 and extends radially or longitudinally outwardly therefrom. Turbine blade 114 also includes an integral platform 126 disposed at the junction of airfoil 124 and base 122 for defining a portion of the radially inner flow path for combustion gases 116. It will be appreciated that turbine blade 114 may be formed in any conventional manner, and is typically a one-piece casting, an additively manufactured part, or an additively manufacturing tip joined to a cast blade base section.

Airfoil 124 may include a pressure side wall 128 and a suction side wall 130 extending between a leading edge 132 and a trailing edge 134. More particularly, airfoil 124 preferably includes a generally concave pressure side wall 128 and a circumferentially or laterally opposite, generally convex suction side wall 130 extending axially between opposite leading and trailing edges 132 and 134, respectively. Side walls 128 and 130 also extend in the radial direction from platform 126 to a radially outer blade tip or, simply, "tip."

Figure 3:
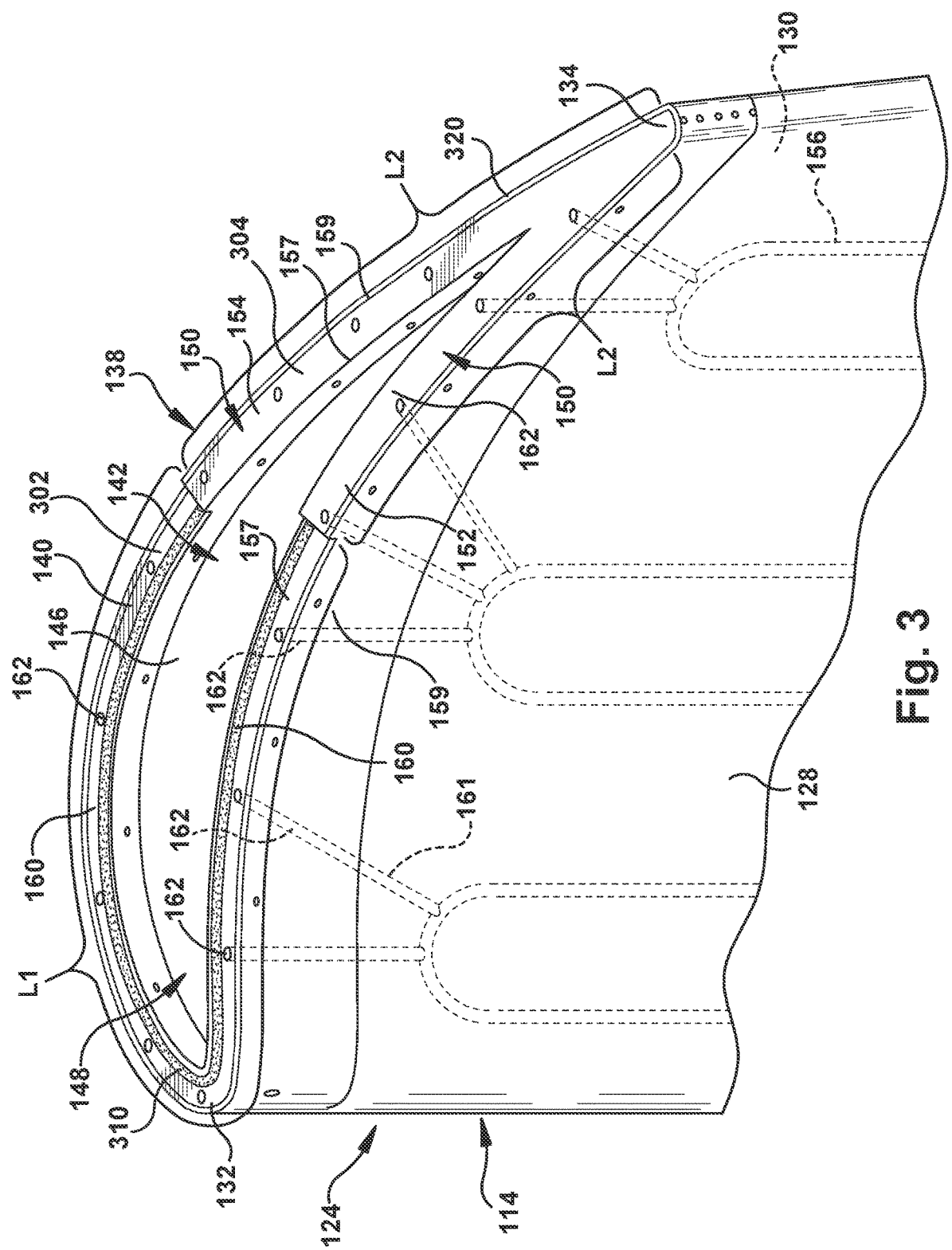
FIG. 3 is a close-up, see-through perspective view of a system for a tip of a turbine component, according to embodiments of the disclosure.
Figure 4:
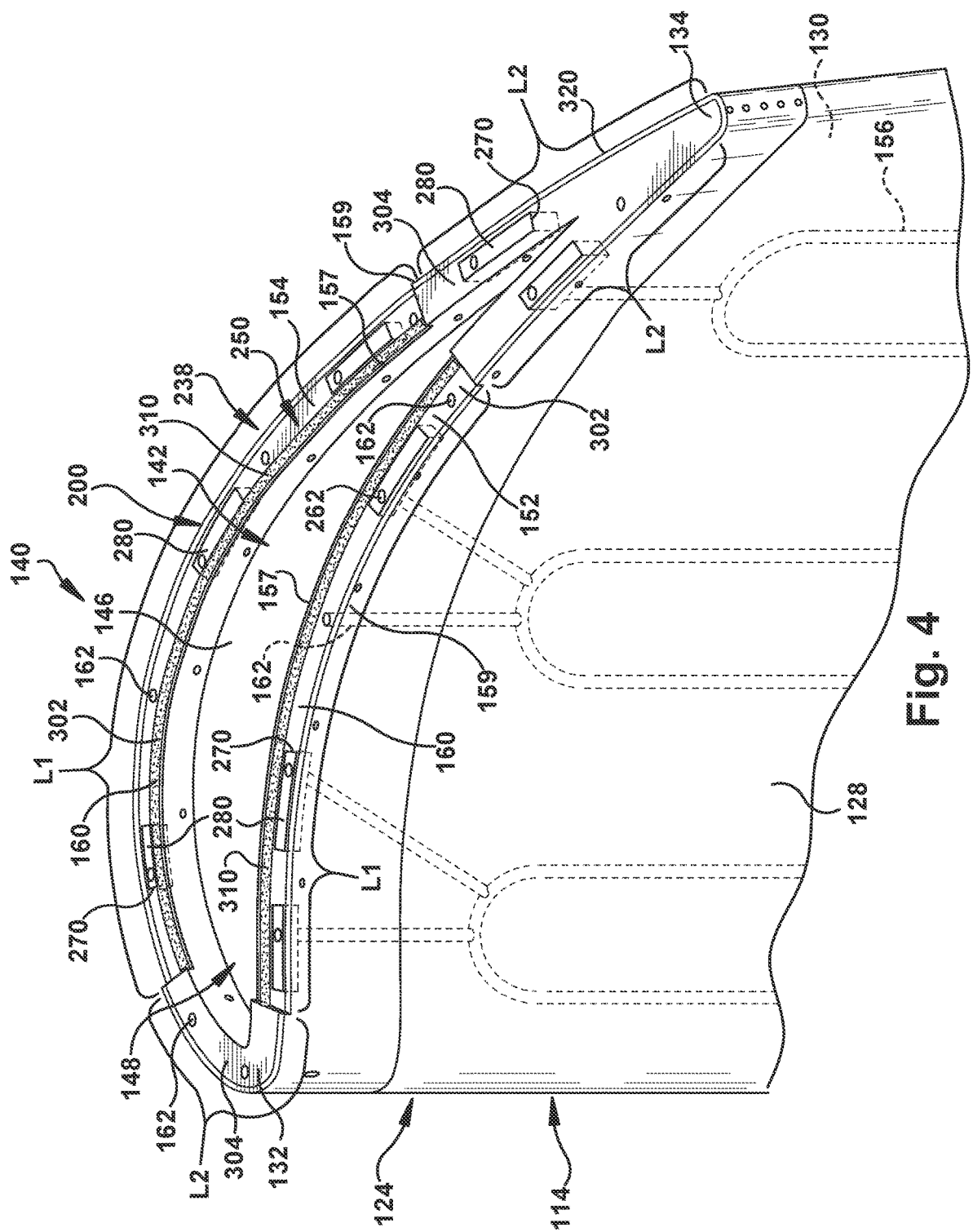
FIG. 4 is a close-up, see-through perspective view of a system for a tip of a turbine component including tip rail cooling insert(s), according to embodiments of the disclosure.

FIGS. 3 and 4 provide close-up, perspective views of illustrative turbine blade tips 138, 238, respectively, at a radial outer end of airfoil 124, on which system 140 according to embodiments of the present disclosure may be employed. In general, tip 138, 238 includes a tip rail 150, 250, and at least one cooling passage 162, 262 extending within tip rail 150, 250, and through a radially outer end surface 160 of tip rail 150, 250, respectively. More particularly, tip 138, 238 may include a tip cavity 142 and tip rail 150, 250 surrounding at least a portion of tip cavity 142. Blade tip 138, 238 is disposed opposite base 122 (FIG. 2) and includes a tip plate 146 defining an outwardly facing tip end 148 between pressure side wall 128 and suction side wall 130. Tip plate 146 typically bounds internal cooling passages (which will be simply referenced herein as an "internal cooling cavity" 156 (also referred to as an "airfoil chamber")) disposed within airfoil 124, and are defined between pressure side wall 128 and suction side wall 130 of airfoil 124. Internal cooling cavity 156 is configured to supply a coolant through airfoil 124, e.g., in a radial direction. That is, coolant such as compressed air bled from the compressor may be circulated through the internal cooling cavity during operation. Internal cooling cavity 156 may include any now known or later developed coolant carrying passages or circuits including but not limited to: cooling passages, impingement sleeves or elements, connecting passages, cavities, pedestals, etc. Tip plate 146 may be integral to turbine blade 114, or it may be welded/brazed into place after the blade is cast.

Blade tips 138, 238 include tip rail 150, 250 to provide certain performance advantages, such as reduced leakage flow. Coinciding with pressure side wall 128 and suction side wall 130, tip rail 150, 250 may be described as including a pressure side wall rail 152 and a suction side wall rail 154, respectively. Generally, pressure side wall rail 152 extends radially outwardly from tip plate 146 and extends from leading edge 132 to trailing edge 134 of airfoil 124. As illustrated, the path of pressure side wall rail 152 is adjacent to or near the outer radial edge of pressure side wall 128 (i.e., at or near the periphery of tip plate 146 such that it aligns with the outer radial edge of the pressure side wall 128). Similarly, as illustrated, suction side wall rail 154 extends radially outwardly from tip plate 146 and may extend from leading edge 132 to trailing edge 134 of airfoil 124. The path of suction side wall rail 154 is adjacent to or near the outer radial edge of suction side wall 130 (i.e., at or near the periphery of the tip plate 146 such that it aligns with the outer radial edge of the suction side wall 130). Pressure side wall rail 152 and/or suction side wall rail 154 may be described as having an inner rail surface 157 and an outer rail surface 159. Pressure side wall rail 152 and/or suction side wall rail 154 may also be described as having a radially outer end surface 160, i.e., a radially outward facing end surface, between inner rail surface 157 and outer rail surface 159. It should be understood that tip rail(s) 150, 250 may not necessarily follow the pressure or suction side wall rails. That is, in alternative types of tips in which the present disclosure may be used, tip rails 150, 250 may be moved away from the edges of tip plate 146 and may not extend to trailing edge 134.

Formed in this manner, it will be appreciated that tip rail 150, 250 defines tip cavity 142 at tip 138, 238 of turbine blade 114. As one of ordinary skill in the art will appreciate, tip 138, 238 configured in this manner, i.e., one having this type of tip cavity 142, is often referred to as a "squealer tip" or a tip having a "squealer pocket or cavity." The height and width of pressure side wall rail 152 and/or suction side wall rail 154 (and thus the depth of tip cavity 142) may be varied depending on best performance and the size of the overall turbine assembly. It will be appreciated that tip plate 146 forms the floor of tip cavity 142 (i.e., the inner radial boundary of the cavity), tip rail 150, 250 forms the side walls of tip cavity 142, and tip cavity 142 remains open through an outer radial face. Tip cavity 142, once installed within a turbine engine, is bordered closely by annular, stationary turbine shroud 120 (see FIGS. 2, 7-9) that is slightly radially offset therefrom. As will be further described herein, radial outer end surface 160 of tip rail 150, 250 may rub against annular, stationary turbine shroud 120 (FIG. 1).

In certain embodiments, as shown generally in FIG. 3, tip rail 150 may have any of a variety of cooling passages 162 extending therethrough to cool the tip rail. Some cooling passage(s) 162 are shown, for example, in FIGS. 3 and 4. In certain embodiments, airfoil 124 and tip 138 may be cast. Alternatively, they may be additively manufactured. In either case, cooling passages 162 may be cast or additively manufactured simultaneously during the airfoil manufacturing process. In other options, cooling passages 162 may be machined into tip 138 after manufacturing without them.

In certain embodiments, as shown in FIG. 4, embodiments of the disclosure may use a turbine blade tip cooling system 200 (hereinafter "cooling system 200") for turbine blade tip 238 including one or more tip rail cooling inserts 280, as shown and described in U.S. Pat. No. 10,934,852. Cooling system 200 may be used in tip rails 250 that do not include cooling passages 162. In this case, cooling system 200 may be the only cooling system provided. Alternatively, as shown in FIG. 4, cooling system 200 may be added to tip rail 250 that already includes cooling passages 162 but requires supplemental cooling, e.g., in particular areas thereof.

With continuing reference to FIG. 4, tip 238 is substantially similar to tip 138 in FIG. 3, except tip cooling insert(s) 280 is/are provided in tip rail 250. Tip rail 250 has inner rail surface 157, outer rail surface 159, and radial outer end surface 160. In contrast to tip rail 150, tip rail 250 has at least one tip rail pocket 270 open at radial outer end surface 160. Each tip rail pocket 270 is fluidly connected to the at least one internal cooling cavity 156 that carries a coolant, e.g., via blade cooling channel(s) 272.

FIG. 5 shows a close-up, perspective view of one example of tip rail cooling insert 280 for purposes of describing system 140. As shown in FIGS. 4 and 5, cooling system 200 also includes tip rail cooling insert(s) 280 having at least one cooling passage 262 therein, and attached to each tip rail pocket 270. More particularly, tip rail cooling insert(s) 280 include cooling passage(s) 262 therein that exit from a surface of the inserts coplanar with a portion of radial outer end surface 160 of tip rail 150, 250. Cooling passage(s) 262 may deliver coolant from within at least one internal cooling cavity 156 in any manner desired, and to any location desired. Tip rail cooling insert(s) 280 may have any form shown and described in U.S. Pat. No. 10,934,852. Tip rail cooling insert(s) 280 can be made of any of the materials listed for tip 138, 238, e.g., N4, N5, etc.

In certain embodiments, tip 138, 238 includes a base material. In some embodiments, the base material includes a metal such as steel or superalloys (e.g., nickel-based superalloys, cobalt-based superalloys, or iron-based superalloys, such as Rene N5, N500, N4, N2, IN718 or Haynes 188) or other suitable materials for withstanding high temperatures. The Ni-based superalloys may be those containing both y and y' phases, particularly those Ni-based superalloys containing both y and y' phases wherein the y' phase occupies at least 40% by volume of the superalloy. Such alloys are known to be advantageous because of a combination of desirable properties including high temperature strength and high temperature creep resistance. The base material may also include a NiAl intermetallic alloy, as these alloys are also known to possess a combination of superior properties including high temperature strength and high temperature creep resistance that are advantageous for use in turbine engine applications used for aircraft. In the case of Nb-base alloys, coated Nb-base alloys having superior oxidation resistance will be preferred, such as Nb/Ti alloys. The base material may also include a Nb-based alloy that contains at least one secondary phase, such as a Nb-containing intermetallic compound, a Nb-containing carbide, or a Nb-containing boride. Such alloys are analogous to a composite material in that they contain a ductile phase (i.e. the Nb-base alloy) and a strengthening phase (i.e., a Nb-containing intermetallic compound, a Nb-containing carbide, or a Nb-containing boride). As previously stated, tip 138, 238 has formed therein a plurality of cooling passages 162, 262 for the passage therethrough of a cooling flow. A TBC 320 may cover inner and outer rail surfaces 157, 159 of tip rail 150, 250 and side walls 128, 130 of airfoil 124.

FIG. 6 shows a plan view of tip rail 150, 250 including system 140 in accordance with various embodiments of the disclosure, and FIGS. 7-9 show cross-sectional views of tip rail 150, 250 including system 140 according to other embodiments of the disclosure. System 140 is configured such that wear and softening of tip 138, 238 is reduced. During operation, tip 138, 238 and shroud 120 (FIGS. 2, 7-9) can face temperatures over about 2200° F. (1205° C.), such as over about 2300° F. (1260° C.), such as about 2300° F. (1260° C.) to about 2400° F. (1316° C.) upon rubbing. System 140 incorporates components that can withstand these high temperatures to aid in the rubbing process and protect the underlying metal from the high temperatures.

As shown in FIGS. 6-9, system 140 has radial outer end surface 160 of tip rail 150, 250 including a first portion 302 radially inward of a second portion 304 thereof. FIG. 7 shows first portion extending to a first radius R1, e.g., from an axis of shaft 108 (FIG. 1), and second portion 304 extending to a second radius R2, where R2>R1. System 140 also includes an abrasive layer 310 extending along first portion 302 of radially outer end surface 160 of tip rail 150, 250 adjacent the at least one cooling passage 162 and/or 262. Abrasive layer 310 extends along at least first portion 302 of tip 138, 238, and is most immediately adjacent to stationary shroud 120 when positioned in the turbine section of the engine (see FIG. 2). More particularly, as shown best in FIGS. 7-9, abrasive layer 310 extends radially outward of second portion 304 of radial outer end surface 160 of tip rail 150, 250. Abrasive layer 310 is not on second portion 304. Hence, abrasive layer 310 may contact stationary shroud 120, prior to second portion 304.

Abrasive layer 310 may include a matrix alloy 312 having a plurality of abrasive grit particles including a plurality of cubic boron nitride (cBN) particles 314 and a plurality of ceramic particles 316 embedded therein. In one embodiment, particles 314, 316 are near a surface of matrix alloy 312. In an embodiment, ceramic particles 316 include aluminum oxide (alumina)($Al_2O_3$) and/or sapphire. In alternate embodiments, ceramic particles 316 may include alumina, sapphire, diamond, rhenium diboride (c-axis), silicon carbide, titanium carbide, tungsten carbide, titanium nitride, silicon nitride, tantalum carbide, and/or any mixture thereof. In an embodiment, matrix alloy 312 includes cobalt-nickel-chrome-aluminum-yttrium (CoNiCrAlY), Haynes 214 or similar alloys having oxidation resistance. Matrix alloy 312, of the abrasive layer 310 is of sufficient thickness to encapsulate the plurality of abrasive grit particles 314, 316 disposed therein. It is well known that hardness is a crucial property of any abrasive grit particle. However, most abrasives, such as those used herein, suffer a loss in hardness and shorter oxidation life at elevated temperatures, although cBN provides improved physical properties by maintaining hardness over a wider temperature range. Encapsulation of the abrasive grit particles 314, 316 within the matrix alloy 312 provides protection to the particles and more particularly, avoids direct exposure of the abrasive grit particles to oxidation. The combined use of this abrasive grit particle encapsulation with the cooling flow through tip 138, 238, as previously described, reduces the temperature of abrasive layer 310 during operation and extends the oxidation life. Abrasive layer 310, and more particularly the plurality of abrasive grit particles 314, 316 enable blade cutting of the EBC/TBC shroud sacrificial coating (also referred to herein as a rub), with minimal wear to tip 138, 238. Additionally, the tip cooling flow guarantees abrasive grit particles 314, 316 remain long enough in engine operation conditions to complete the rub.

Abrasive layer 310 may be formed by any suitable process. For instance, laser cladding may be used to form abrasive layer 310, and any additional layers (e.g., a buffer layer of the same material as tip rail 150, 250 or any material having good weldability and oxidation resistance) disposed between abrasive layer 310 and first portion 302 of tip rail 150, 250. As illustrated in a finished form in FIGS. 6-9, during the laser cladding process, a metal alloy powder and cBN and ceramic abrasive powder feedstock materials (such as those identified) are melted and consolidated by use of a laser, to deposit a laser clad material layer, and more particularly, abrasive layer 310 on first portion 302 of radial outer end surface 160 of tip rail 150, 250. For example, a first metal alloy powder may be melted and consolidated by use of a laser, to deposit a laser clad material layer, and more particularly, a buffer layer (not shown for clarity) on first portion 302 of radial outer end surface 160 of tip rail 150, 250 for improved lattice matching. A second metal alloy powder and abrasive powders are next melted and consolidated by use of a laser to deposit a laser clad material layer, and more particularly, abrasive layer 310 on first portion 302 of the surface of any buffer layer. In an embodiment, the first metal alloy powder and the second metal alloy powder comprise the same material. In an embodiment, the first metal alloy powder and the second metal alloy powder comprise different materials. In an embodiment, the first metal alloy powder and the second metal alloy powder comprise the same material as the blade material. In an embodiment, the first metal alloy powder and the second metal alloy powder comprise different materials than the blade materials. In alternate embodiments, braze technology or additive methods are used to form the buffer layer (when included) and/or abrasive layer 310.

As shown in FIGS. 6-9, first portion 302 being radially inward of second portion 304 of radial outer end surface 160 may be provided in a number of ways. In any event, as shown in the schematic view in FIG. 7, first portion 302 may be radially inward of the second portion 304 by a distance D that is in a range of 50% to 90% of a radial extent (i.e., height H) of abrasive layer 310. In certain embodiments, as shown in FIGS. 3, 4, 6 and 7, first portion 302 may extend along at least one first length L1 of tip rail 150, 250 that excludes second portion 304, and second portion 304 may extend along at least one second length L2 of tip rail 150, 250 that excludes first portion 302. In FIGS. 3, 4, 6 and 7, first portion 302 is a recessed portion of radial outer end surface 160 that extends first length(s) L1 and an entire width W of tip rail 150, 250. Second portion 304 is an un-recessed portion of radial outer end surface 160 that extends second length(s) L2 and an entire width W of tip rail 150, 250. FIG. 7 shows first and second portions 302, 304 in this version side-by-side for comparison.

In certain embodiments, as shown in FIG. 8, first portion 302 may be surrounded by second portion 304, providing a stepped surface 322 in which abrasive layer 310 is positioned. In this example, stepped surface 322 faces inwardly toward tip plate 146 and tip cavity 142. In certain embodiments, as shown in FIG. 9, first portion 302 includes an extent of radial outer end surface 160 of tip rail 150, 250 that is radially adjacent at least one of suction side rail wall 152 and pressure side rail wall 154. First portion 302 is also radially adjacent at least one of suction side wall 130 and pressure side rail wall 132 of airfoil 124, i.e., eliminating a section of outer rail surface 159 and creating a stepped surface 322. In this example, stepped surface 322 faces outwardly from tip plate 146 and tip cavity 142.

FIG. 3 shows one first portion 302 and two second portions 304, and FIG. 4 shows two first portions 302 and three second portions 304. While a particular number of first portions 302 and second portions 304 have been illustrated, e.g., in FIGS. 3, 4 and 6, any number of portions 302, 304 may be used in any embodiment to provide abrasive layer 310 in any desired location. First portion(s) 302 can be provided at any location, e.g., suction side, pressure side, both suction and pressure side, and can extend for any desired length.

Figure 10:
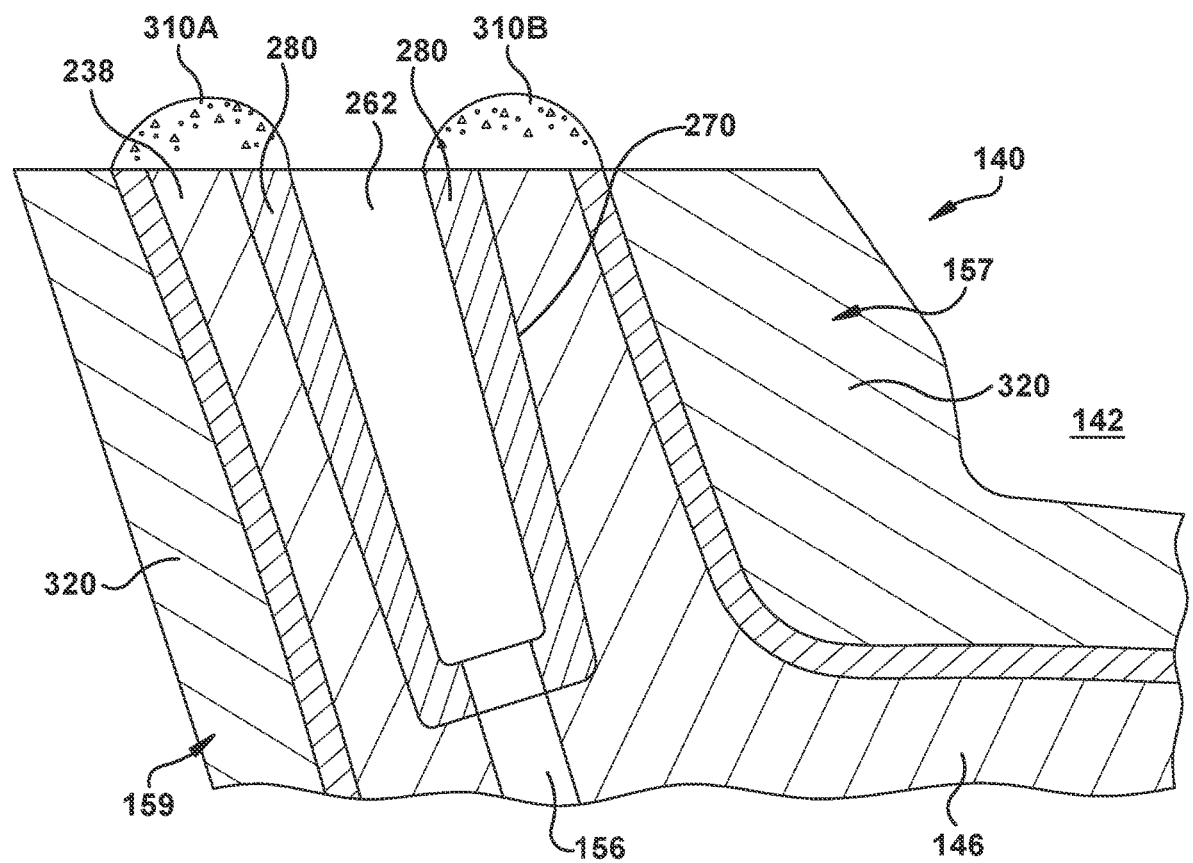
FIG. 10 is a cross-sectional view of a tip rail including a tip rail cooling insert and an abrasive layer, according to embodiments of the disclosure.

In FIGS. 3-9, a single abrasive layer 310 in the form a single laser welded bead is shown. As shown in FIG. 10, in certain embodiments, abrasive layer 310 may include a pair of spaced abrasive layers 310A, 310B extending along first portion 302 of radially outer end surface 160 of the tip rail. In FIG. 10, tip rail 250 includes tip rail inserts 280, but the teachings are equally applicable to tip rail 138 in FIG. 3. In this case, cooling passage(s) 162, 262 (latter shown) is positioned between the pair of spaced abrasive layers 310A, 310B in the radial outer end surface 160 of the tip rail 250.

In certain embodiments, as shown in FIGS. 7-9, system 140 may also include a stationary blade shroud 120 including a body 330 and an abradable coating 332 on body 330. Abradable coating 332 may include a bond coat 334 on body 330, an optional strain tolerant layer 336 on bond coat 334, and an abradable TBC 338 on bond coat 334 or strain tolerant layer 336 (where provided). Strain tolerant layer 336 may include, for example, an yttria-stabilized zirconia (YSZ), and the abradable TBC 338 may include a dense vertically-cracked thermal barrier coating (DVC-TBC). In certain embodiment, the DVC-TBC may include but is not limited to: a rare earth doped zirconium oxide, yttria stabilized zirconia (YSZ), mullite ($3AL_2O_3$-$2SiO_2$), alumina ($Al_2O_3$), ceria ($CeO_2$), rare-earth zirconates (e.g., $La_2Zr_2O_7$), rare-earth oxides (e.g., $La_2O_3$, $Nb_2O_5$, $Pr_2O_3$, $CeO_2$), a metal glass composite, and combinations thereof (e.g., alumina and YSZ or ceria and YSZ). In the case of YSZ, by substituting a certain amount of zirconium ions ($Zr_4$) with slightly larger yttrium ions ($Y3^+$), stable sintered xYSZ (x represents mol % of Yttrium ions, e.g., 8YSZ) can be obtained. A bond coat may include but is not limited to: cobalt-nickel-chromium-aluminum-yttrium (CoNiCrAlY), nickel-chromium-aluminum-yttrium (NiCrAlY), nickel-cobalt-chromium-aluminum-yttrium (NiCoCrAlY), and/or cobalt-chromium-aluminum-yttrium (CoCrAlY). In any event, TBC 338 is considerably less porous than conventional abradable TBCs. In certain embodiments, TBC 338 may have a porosity of less than 5%. TBC usually has a surface roughness of 450 Ra after spray application. However, abradable coating 332 may have a surface roughness of less than 90 Ra after smoothing with, for example, a grinding wheel, and as measured, for example, by a stylus profilometer. Abrasive layer 310 according to embodiments of the disclosure allows use of a dense and smooth TBC 338 to attain a quality gap between tip rail 150, 250 and shroud 120, rather than a porous TBC with a rough surface.

Figure 11:
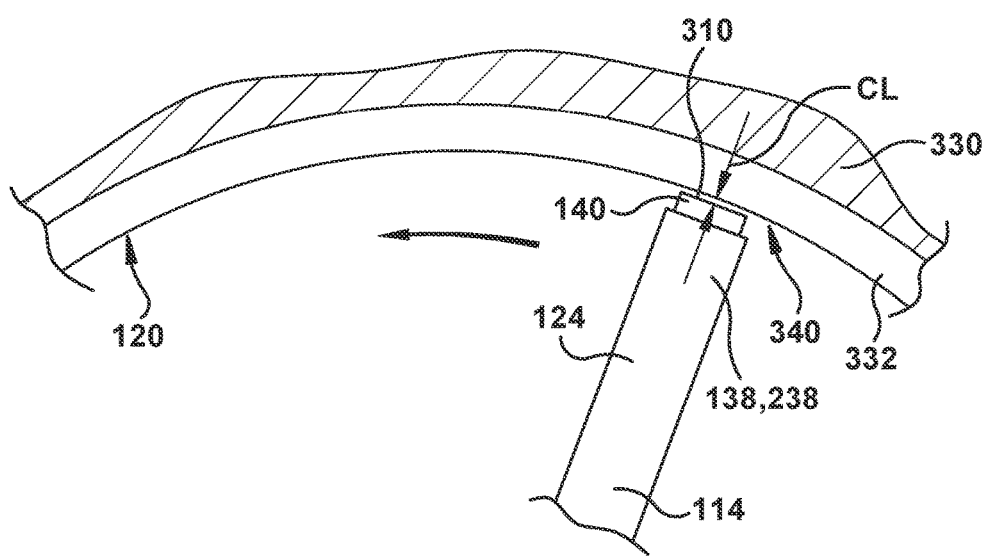
FIG. 11 is a schematic view of a tip and a stationary shroud during operation, according to embodiments of the disclosure.

As shown in FIG. 11, in operation, stationary blade shroud 120 and tip 138, 238 of turbine blade 114 are configured so abrasive layer 310 on tip rail 138, 238 contacts a portion of the stationary blade shroud 120, i.e., abradable coating 332 during rotation of the turbine blade. As described herein, abradable coating 33 is configured to be abraded by the contact with abrasive layer 310. Turbine blade 114 includes a plurality of cooling passages 162, 262 (e.g., FIGS. 3 and 4) formed therein. System 140 is disposed on tip 138, 238. Illustrated is the rubbing at an interface 340 of system 140 disposed on tip 138, 238 and abradable coating 332 during rotation of turbine blade 114, as indicated by the arrow. Subsequent to a full rotation of turbine blade 114, or a complete rub, a radial or clearance gap $C_L$ is defined between tip 138, 238 and an inner surface of shroud 120 without damage to tip 138, 238. The plurality of abrasive grit particles 314, 316 encapsulated within matrix alloy 312 of system 140 are no longer needed and may be volatized subsequent to completion of the rub.

Reducing blade wear has been challenging for turbine blades, and in particular metallic turbine blades. Regardless of the environmental temperature, the blade tip temperature can exceed the metal's softening point during high speed rubbing due to the high rubbing forces associated with high blade tip speed and relatively low thermal convection/conduction at the blade tip. Reducing the shroud coating stiffness benefits blade wear, but can also result in shorter coating life. To minimize blade wear in a rubbing event, it has been found that materials with a higher strength and stiffness than the shroud materials can beneficially be applied to the turbine blades, in particular blade tips. There is a feasible way of reducing the blade wear by integrating direct cooling to the blade tip to prevent oxidation of an abrasive layer, whereby the system has a higher strength than a bare blade tip to cut the shroud coating and thus mitigate blade wear.

System 140 applied to the cooled turbine blades 114 in use with a smooth finish surface (e.g., <90 Ra), TBC-coated shrouds 120 provides reduces blade wear in rubbing events. Without intending to be bound by theory, the cooled blade 114 having a system 140 disposed thereon functions by: (1) preventing oxidation of the abrasive particles 314, 316 within the system prior to completion of the rub event; (2) cutting into TBC layers due to the higher hardness of the abrasive layer; and (3) isolating the metal blade tip 138, 238 from overheating during rubbing (significantly lower rubbing force), thereby mitigating blade wear. In comparison to a bare N5 blade, the rub ratio of a cooled blade tip 138, 238 with abradable coating 332 can be reduced. For example, the rub ratio may be less than 20% blade tip wear compared to greater than 100% blade tip wear for every 0.0254 millimeters (0.001 inch) of incursion for turbine conditions.

With regard to the blade cooling, system 140 also allows customized cooling using tip rail cooling inserts 280, and thus allows for higher efficiency by creating a smaller tip gap $C_L$ and lower leakage compared to conventional systems. More particularly, where provided, tip rail cooling insert 280 allows for selectively placed cooling of tip rail 238 in used or new turbine blades. That is, tip rail cooling insert can deliver coolant to those areas of the tip and/or tip rail, e.g., the suction side, aft portion thereof, requiring additional cooling compared to other parts of the tip. The tip rail cooling insert may also improve cooling of the tip rail while metering coolant therethrough. The tip rail cooling insert may also address dust clogging.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A system, comprising:
   a turbine blade having:
   an airfoil having a pressure side wall and a suction side wall extending between a leading edge and a trailing edge;
   a tip at a radial outer end of the airfoil, the tip including a tip cavity, a tip rail surrounding at least a portion of the tip cavity and at least one cooling passage extending through a radially outer end surface of the tip rail,
   wherein the radial outer end surface includes a first portion radially inward of a second portion thereof, wherein the first portion is surrounded by the second portion, providing a stepped surface that faces inwardly toward the tip cavity; and
   an abrasive layer extending along the first portion of the radially outer end surface of the tip rail adjacent the at least one cooling passage,
   wherein the abrasive layer includes a matrix alloy having a plurality of cubic boron nitride (cBN) particles and a plurality of ceramic particles embedded therein, and wherein the abrasive layer extends radially outward of the second portion of the radial outer end surface of the tip rail; and
   a stationary blade shroud including a body and an abradable coating on the body,
   wherein the stationary blade shroud and the tip of the turbine blade are configured so the abrasive layer on the tip rail contacts a portion of the stationary blade shroud during rotation of the turbine blade, wherein the abradable coating is configured to be abraded by the contact with the abrasive layer.

2. The system of claim 1, wherein the first portion is radially inward of the second portion by a distance that is in a range of 50% to 90% of a radial extent of the abrasive layer.

3. The system of claim 1, wherein the first portion extends along a first length of the tip rail that excludes the second portion, and the second portion extends along at least one second length of the tip rail that excludes the first portion.

4. The system of claim 1, wherein the first portion includes an extent of the radial outer end surface of the tip rail that is radially adjacent at least one of the suction side and the pressure side wall of the airfoil.

5. The system of claim 1, wherein the plurality of ceramic particles include at least one of: aluminum oxide, sapphire, diamond, rhenium diboride (c-axis), silicon carbide, titanium carbide, tungsten carbide, titanium nitride, silicon nitride, and tantalum carbide.

6. The system of claim 1, wherein the matrix alloy includes cobalt-nickel-chrome-aluminum-yttrium (CoNiCrAlY).

7. The system of claim 1, wherein the abradable coating includes a bond coat on the body, a strain tolerant layer on the bond coat, and an abradable thermal barrier coating (TBC) on the strain tolerant layer.

8. The system of claim 7, wherein the strain tolerant layer includes an yttria-stabilized zirconia (YSZ), and the abradable TBC includes a dense vertically-cracked thermal barrier coating (DVC-TBC).

9. The system of claim 8, wherein the DVC-TBC includes a rare earth doped zirconium oxide, yttria stabilized zirconia (YSZ), mullite ($3AL_2O_3\text{-}2SiO_2$), alumina ($Al_2O_3$), ceria ($CeO_2$), rare-earth zirconates, rare-earth oxides, a metal glass composite, and combinations thereof.

10. The system of claim 1, wherein the abradable coating has a porosity of less than 5%.

11. The system of claim 1, wherein the tip rail includes a tip rail pocket and a tip rail cooling insert having the at least one cooling passage therein, wherein the tip rail cooling insert is attached to the tip rail pocket.

* * * * *